United States Patent
Zhou et al.

(10) Patent No.: US 8,641,273 B2
(45) Date of Patent: Feb. 4, 2014

(54) THERMAL INTERLOCK FOR BATTERY PACK, DEVICE, SYSTEM AND METHOD

(75) Inventors: Peng Zhou, El Cerrito, CA (US); Paul Tsao, Los Altos, CA (US); David Kevin Pariseau, Los Altos, CA (US)

(73) Assignee: Sinoelectric Powertrain Corporation, Sunnyvale, CA (US)

( * ) Notice: Subject to any disclaimer, the term of this patent is extended or adjusted under 35 U.S.C. 154(b) by 219 days.

(21) Appl. No.: 12/938,284

(22) Filed: Nov. 2, 2010

(65) Prior Publication Data
US 2012/0106593 A1    May 3, 2012

(51) Int. Cl.
*G01K 11/06* (2006.01)
*G01N 17/00* (2006.01)
*H01M 10/50* (2006.01)
*H02H 5/04* (2006.01)

(52) U.S. Cl.
USPC ............. 374/57; 374/4; 374/160; 374/141; 429/62; 320/154; 361/93.8; 361/103

(58) Field of Classification Search
USPC ............ 374/4, 5, 57, 43–45, 100, 141, 163, 374/183, 185, 160; 338/22 R, 25, 28; 429/62, 163
See application file for complete search history.

(56) References Cited

U.S. PATENT DOCUMENTS

| | | | |
|---|---|---|---|
| 2,258,221 A * | 10/1941 | Rochow | 174/121 SR |
| 4,135,593 A | 1/1979 | Fowkes | |
| 4,255,698 A * | 3/1981 | Simon | 320/134 |
| 4,652,964 A * | 3/1987 | Ziegenbein | 361/54 |
| 5,059,895 A * | 10/1991 | Cataldi et al. | 324/104 |
| 5,158,841 A | 10/1992 | Mennicke et al. | |
| 5,207,276 A | 5/1993 | Scofield | |
| 5,227,259 A | 7/1993 | Weaver et al. | |
| 5,534,759 A | 7/1996 | Evans et al. | |
| 5,542,488 A | 8/1996 | Nixon | |
| 5,608,304 A * | 3/1997 | Okumura | 320/134 |
| 5,624,003 A | 4/1997 | Matsuki et al. | |
| 5,670,861 A | 9/1997 | Nor | |
| 5,767,659 A * | 6/1998 | Farley | 320/106 |
| 5,806,618 A | 9/1998 | Luode | |
| 5,815,824 A | 9/1998 | Saga et al. | |
| 5,834,132 A | 11/1998 | Hasegawa et al. | |
| 5,861,610 A | 1/1999 | Weiss | |

(Continued)

FOREIGN PATENT DOCUMENTS

| | | | |
|---|---|---|---|
| JP | 04298969 A | * | 10/1992 |
| JP | 2008288046 A | * | 11/2008 |
| JP | 2011171255 A | * | 9/2011 |

OTHER PUBLICATIONS

International Search report dated Jun. 30, 2011, International Application No. PCT/US2011/031634, 6 pages.

(Continued)

*Primary Examiner* — Gail Verbitsky (57) ABSTRACT

Faulty battery detecting and locating devices and methods are able to detect and locate a faulty battery cell. The device applies an energy to a sensing member, such as a polymeric tube containing at least two polymer-coated and twisted electric wires. Heat that is generated by a faulty battery triggers an electric communication between the two electric wires by melting at least a portion of the polymer. The resulting change in resistance between the two electric wires is used to detect and locate a faulty battery.

6 Claims, 5 Drawing Sheets

(56) References Cited

U.S. PATENT DOCUMENTS

| | | | |
|---|---|---|---|
| 5,903,154 A | 5/1999 | Zhang et al. | |
| 5,948,298 A | 9/1999 | Ijaz | |
| 6,114,942 A * | 9/2000 | Kitamoto et al. | 338/22 R |
| 6,337,559 B1 * | 1/2002 | Sato | 320/134 |
| 6,444,350 B1 | 9/2002 | Toya et al. | |
| 6,531,846 B1 * | 3/2003 | Smith | 320/134 |
| 6,631,775 B1 | 10/2003 | Chaney | |
| 6,747,437 B2 | 6/2004 | Chiu | |
| 7,270,910 B2 | 9/2007 | Yahnker et al. | |
| 7,507,500 B2 | 3/2009 | Donnelly et al. | |
| 7,520,355 B2 | 4/2009 | Chaney | |
| 7,923,967 B2 * | 4/2011 | Hamaguchi et al. | 320/134 |
| 8,004,244 B2 * | 8/2011 | Cromer et al. | 320/134 |
| 8,198,975 B2 * | 6/2012 | Sha et al. | 338/22 R |
| 2001/0041285 A1 * | 11/2001 | Shiota et al. | 429/62 |
| 2002/0188387 A1 | 12/2002 | Woestman et al. | |
| 2003/0090855 A1 * | 5/2003 | Chu et al. | 361/305 |
| 2003/0157399 A1 * | 8/2003 | Ikeuchi et al. | 429/62 |
| 2003/0205421 A1 | 11/2003 | Allen et al. | |
| 2004/0018417 A1 | 1/2004 | Stack | |
| 2005/0069773 A1 | 3/2005 | Nakai | |
| 2005/0077878 A1 * | 4/2005 | Carrier et al. | 320/134 |
| 2005/0089750 A1 | 4/2005 | Ng et al. | |
| 2005/0231169 A1 * | 10/2005 | Seo et al. | 320/150 |
| 2006/0051660 A1 * | 3/2006 | Chang et al. | 429/62 |
| 2007/0054178 A1 * | 3/2007 | Moon et al. | 429/62 |
| 2007/0079500 A1 * | 4/2007 | Silverman | 29/623.1 |
| 2007/0089442 A1 | 4/2007 | Tsuchiya | |
| 2007/0188147 A1 | 8/2007 | Straubel et al. | |
| 2007/0188148 A1 * | 8/2007 | Kawasumi et al. | 320/134 |
| 2008/0053716 A1 | 3/2008 | Scheucher | |
| 2008/0096072 A1 | 4/2008 | Fukusako et al. | |
| 2008/0116851 A1 * | 5/2008 | Mori | 320/134 |
| 2008/0230288 A1 | 9/2008 | Shiomi et al. | |
| 2008/0275600 A1 | 11/2008 | Rask et al. | |
| 2008/0290080 A1 | 11/2008 | Weiss | |
| 2009/0041992 A1 * | 2/2009 | Umeda et al. | 428/200 |
| 2009/0085519 A1 * | 4/2009 | Kim | 320/134 |
| 2009/0123814 A1 | 5/2009 | Cabot et al. | |
| 2009/0273314 A1 * | 11/2009 | Yoshikawa | 320/134 |
| 2010/0021802 A1 * | 1/2010 | Yang et al. | 429/91 |
| 2010/0136392 A1 * | 6/2010 | Pulliam et al. | 429/90 |
| 2010/0291418 A1 | 11/2010 | Zhou et al. | |
| 2010/0291419 A1 | 11/2010 | Zhou | |
| 2010/0291426 A1 | 11/2010 | Zhou | |
| 2010/0291427 A1 | 11/2010 | Zhou | |
| 2011/0050175 A1 * | 3/2011 | Odaohhara et al. | 320/134 |
| 2011/0248684 A1 | 10/2011 | Zhou | |
| 2012/0181988 A1 * | 7/2012 | Uchibori | 320/134 |
| 2012/0199574 A1 * | 8/2012 | Weiss et al. | 219/481 |
| 2013/0011733 A1 * | 1/2013 | Chang et al. | 429/211 |
| 2013/0171484 A1 * | 7/2013 | Baginska et al. | 429/62 |
| 2013/0224557 A1 * | 8/2013 | Hayakawa et al. | 429/144 |

OTHER PUBLICATIONS

Polymeric positive temperature coefficient.' Brochure, [Online] Apr. 14, 2008, Retrieved from the Internet: [retrieved on Jan. 15, 2012].

* cited by examiner

THERMAL INTERLOCK FOR BATTERY PACK, DEVICE, SYSTEM AND METHOD

FIELD OF THE INVENTION

The present invention relates to devices for and methods of detecting faulty batteries. More specifically, the present invention relates to a heat-triggered electricity halt of the batteries on electric vehicles.

BACKGROUND OF THE INVENTION

Typically, a faulty battery cell can cause high heat, which can result in a temperature as high as 500° C. at the cell. If a fault of a battery at its outset of the fault cannot be detected and the faulty battery is not electrically isolated, a significant danger is posed.

Especially, electric vehicles/hybrid vehicles are equipped with hundreds of battery cells. High heat generated by a faulty battery can cause an explosion of the faulty battery cell or cause a malfunction of neighboring battery cells. Typical technology for detecting a faulty battery involves using smoke detectors to detect smoke generated by a faulty battery, which is slow in its response time and low in its sensitivity. Accordingly, better devices and methods to detect a faulty battery cell are needed.

SUMMARY OF THE INVENTION

Methods of and devices for detecting a faulty battery are provided. In some embodiments, the devices can include a sensing member, which couples with multiple battery cells. In some embodiments, the sensing member contains at least two twisted conducting members electrically isolated from each other. In some embodiments, the electrical isolation is achieved by wrapping at least one of the twisted conducting members with a polymer or plastic. In alternative embodiments, both of the twisted conducting members are wrapped with a polymer. The polymers are able to be in tubing structures, so that the polymers are able to surround each of the conducting members thereby electrically isolating them from each other. In some embodiments, an electric voltage is applied to at least one of the conducting members, so that a fault of the battery cells is able to be detected when sensing a change of the electrical resistance, the electric voltage, and/or the electric current of the sensing member.

In first aspect, a battery fault detecting device comprises at least one heat sensitive member having a heat-dependent conductivity and a controller for disconnecting a faulty battery from a system when the heat-dependent conductivity exceeds a predetermined threshold. In some embodiments, the at least one of heat sensitive members is in thermal contact with a battery. In other embodiments, the conductivity comprises electrical conductivity. In some other embodiments, the heat sensitive member comprises a first electrically conductive wire, a second electrically conductive wire, and a polymer, wherein the polymer electrically isolates the first and the second electrically conductive wires from each other. In some other embodiments, the polymer is fabricated to melt when exposed to heat at the predetermined threshold, thereby electrically coupling the first and second wires. In some embodiments, the electrically coupling of the first electrically conductive wire and the second electrically conductive wire is able to cause an electric disconnection from the faulty battery. In other embodiments, the electrically coupling of the first electrically conductive wire and the second electrically conductive wire is able to cause an electric vehicle to be electrically disconnected from a power source that contains the faulty battery. In some other embodiments, the heat sensitive member comprises at least one electrically conductive wire. In other embodiments, the at least one electrically conductive wire comprises a positive temperature coefficient (PTC) material. In some other embodiments, the PTC material is capable of changing a value of electrical conductivity when exposed to heat above the predetermined threshold. In some embodiments, the polymer comprises a negative temperature coefficient (NTC) material. In other embodiments, the NTC material is capable of changing a value of electrical conductivity in response to a fault occurring in the battery. In some other embodiments, the heat sensitive member signally couples with a fault bus, so that the heat generated by the faulty battery received by the heat sensitive member is able to trigger an electricity disconnection signal transmitted through the fault bus to disconnect an electric vehicle from at least a portion of a power supply containing the faulty battery.

In second aspect, a faulty battery locating system comprising a heat sensitive member thermally coupling with multiple battery cells, wherein a conductivity of the heat sensitive member is capable of changing in response to heat from a faulty battery of the multiple battery cells, so that a location of the faulty battery is capable of being identified. In some embodiments, the conductivity comprises electrical conductivity, thermal conductivity, magnetic conductivity, optical conductivity, or a combination thereof. In other embodiments, an amount of the conductivity change is related to the location of the faulty battery. In some other embodiments, the system further comprises a sensing circuit capable of measuring the electrical conductivity of the heat sensitive member. In some embodiments, the heat sensitive member comprises a first electrically conductive wire, a second electrically conductive wire, and a polymer, wherein the polymer electrically isolates the first and the second electrically conductive wires from each other. In other embodiments, the polymer melts when exposed to a predetermined temperature, so that the first electrically conductive wire is capable of electrically coupling with the second electrically conductive wire. In some other embodiments, the electrically coupling of the first electrical conductive wire and the second electrical conductive wire is able to cause an electrical disconnection from the faulty battery. In some embodiments, the electrically coupling of the first electrical conductive wire and the second electrical conductive wire is able to cause an electrical disconnection of an electric vehicle from a power source containing the faulty battery.

In third aspect, a method of detecting a faulty battery comprises detecting a location of a fault in a battery pack from a resistance of a wire in thermal contact with the battery pack. In some embodiments, the location corresponds to an individual battery of multiple batteries, wherein the multiple batteries form the battery pack. In other embodiments, the fault is heating above a predetermined temperature. In some other embodiments, the method further comprises disconnecting the faulty battery from the battery pack. In some embodiments, the resistance comprises electrical conductivity. In other embodiments, the method further comprises detecting a change of the resistance of the wire. In some other embodiments, the wire comprises a first conducting wire and a second conducting wire electrically isolated from each other by a first polymer. In some other embodiments, the first polymer has a melting point lower than a melting point of the second polymer. In some embodiments, the melting point is higher than a normal battery cell operating temperature and below an explosion temperature of the faulty battery. In other embodiments, the first polymer has a melting point above 140° F. In some other embodiments, the first polymer covers and electrically isolates the first conducting wire from the second conducting wire. In some embodiments, the method further comprises a second polymer that electrically isolates the second conducting wire. In other embodiments, the method further comprises a third polymer enclosing the first and the second conducting wires. In some other embodiments, the third polymer has a melting point different from a melting point of the first polymer, the second polymer, or both. In some embodiments, the third polymer has a melting point higher than a melting point of the first polymer, the second polymer, or both.

DETAILED DESCRIPTION OF THE INVENTION

Methods of and devices for detecting a faulty battery are provided. In some embodiments, the device comprises a sensing wire. In some embodiments, a change of conductivity of the sensing wire signifies a fault of a battery. The conductivity is able to include electric conductivity, thermal conductivity, optical conductivity, magnetic conductivity, or a combination thereof. In some embodiments, the change of conductivity is caused by a "short," a contact, or a communication of at least two twisted or helix type conducting wires within the sensing wire. In some embodiments, the short, the contact, or some of the energy communications of at least two twisted or helix type conducting wires are caused by a heat generated by a faulty battery. In some embodiments, the heat destructs the isolation of the twisted conducting wires, which causes the contact of or some type of energy communication between the conducting wires. The fault to be detected includes a fault on a battery cell, a battery module, or a battery pack. A battery module comprises an arranged array of battery cells, and a battery pack comprises one or more sets of modules.

Figure 1:
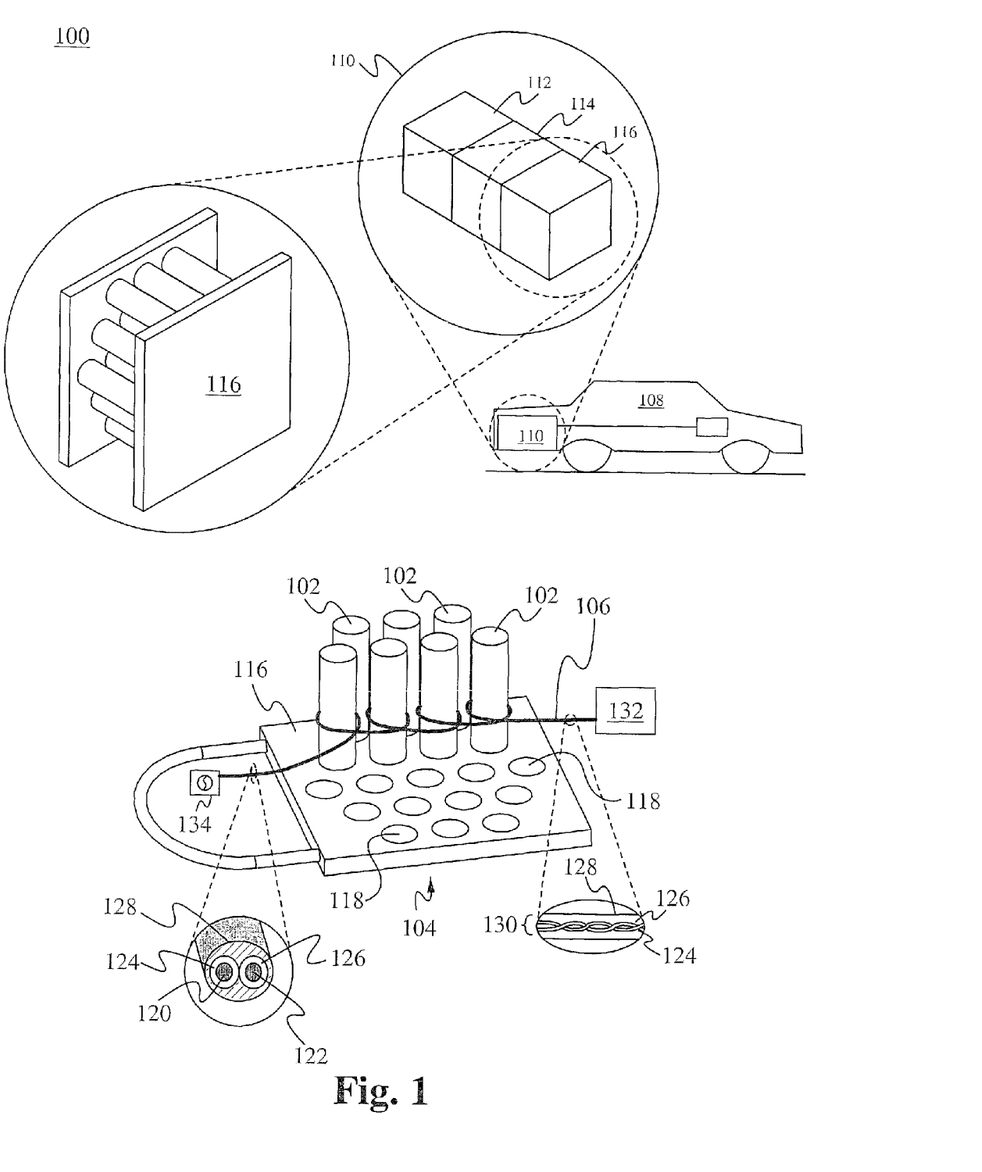
FIG. 1 is a front view of a battery fault detecting system in accordance with some embodiments of the present invention.

FIG. 1 is a front view of a battery fault detecting system 100 in accordance with some embodiments of the present invention. In some embodiments, the battery fault detecting system 100 comprises a sensing member 106 on a module 104. The sensing member 106 is able to contain a first conducting member 120 and a second conducting member 122. In some embodiments, the first conducting member 120 and the second conducting member 122 are electrical wires capable of conducting electric current, electric voltage, electronic signals, or a combination thereof. In alternative embodiments, the first conducting member 120 and the second conducting member 122 contain optical conducting elements, such as optic fibers. Any conducting materials are able to be used, so long as the conducting materials are able to conduct or transmit energies, such as light, sound, waves, magnetic signals, electrical signals, or a combination thereof.

In some embodiments, the first conducting member 120 is wrapped or enclosed by a first polymer 124 and the second conducting member 122 is wrapped or enclosed by a second polymer 126, so that the first polymer 124, the second polymer 126, or both form an insulating material, which is able to prevent a contact or communication between the first conducting member 120 and the second conducting member 122. The communication includes any coupling or exchange of the energies propagating along the first conducting member 120 and the second conducting member 122. In some embodiments, the first conducting member 120 enclosed by the first polymer 124 and the second conducting member 122 enclosed by the second polymer 126 are twisted together to form a helix or spiral structure 130.

In some embodiments, the spiral structure 130 is able to be enclosed in a third polymer 128. The third polymer 128 is able to contain a tubing structure to accommodate the spiral structure 130. In some embodiments, the first polymer 124, the second polymer 126, and the third polymer 128 are able to have the same or different melting points, so each polymer is able to be destructed/melted at the same or different temperatures as desired or selected by design.

In some embodiments, the battery fault detecting system 100 is used on a battery module 116 containing battery cells 102 that are in the battery holes 118. With a faulty battery sensing member 106 attached to the battery cells 102, a fault of at least one of the battery cells 102 is able to be detected by the sensing member 106. In some embodiments, the faulty battery sensing member 106 is connected to control units 132 and/or 134, which is capable of generating and/or receiving signals to/from the sensing member 106. In some embodiments, control unit 132 is able to control an electricity providing circuit. The electricity providing circuit is able to be contained in the control unit 132.

In some embodiments, the battery module 116 is able to be a portion of a battery pack 110. The battery pack 110 is able to contain multiple battery modules, such as battery modules 112, 114, 116. In some embodiments, the battery pack 110 is able to be attachable/removable from an electric/hybrid vehicle 108. In some embodiments, the battery fault detecting system 100 is used to detect a faulty battery cell. In alternative embodiments, the battery fault detecting system 100 is used on the battery module 116 and/or the battery pack 110. A person skilled in the art will appreciate that the battery fault detecting system 100 is able to be used in any devices that contain one or more batteries of any type, such as Li-ion, Cd—H, Cd—Ni, Ni—Zn, fuel cell, and hydrogen batteries, to name only a few types.

Figure 2A:
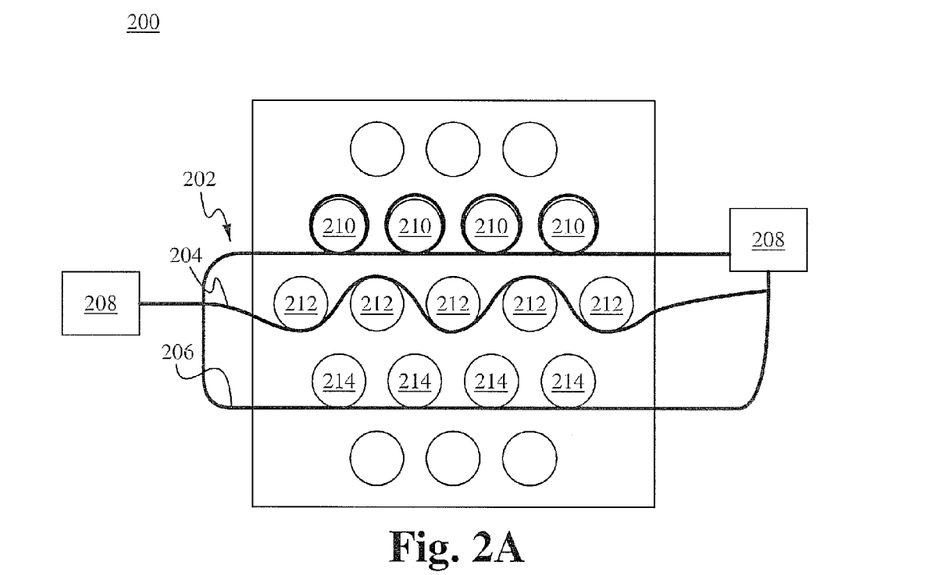
FIG. 2A is a top view of a battery fault detecting system in accordance with some embodiments of the present invention.

FIG. 2A is a top view of a battery fault detecting system 200 in accordance with some embodiments of the present invention. The battery fault detecting system 200 is able to be coupled with battery cells in various ways. In some embodiments, the battery fault detecting system 200 includes one or more sensing members 202, 204, 206 connecting to detecting circuit 208. The construction of the one or more sensing members 202, 204, 206 can be similar to the sensing member 106 (FIG. 1). In some embodiments, the sensing member 202 wraps around the battery cells 210 in complete circles. In alternative embodiments, the sensing member 204 touches alternating sides of the battery cells 212. In some alternative embodiments, the sensing member 206 touches similar sides of the battery cells 214. A person who has ordinary skill in the art will appreciate that any other ways to couple the sensing members 202, 204, 206 with the battery cells are applicable, so long as the application is capable of detecting a faulty condition of the battery cells 210, 212, 214.

Figure 2B:
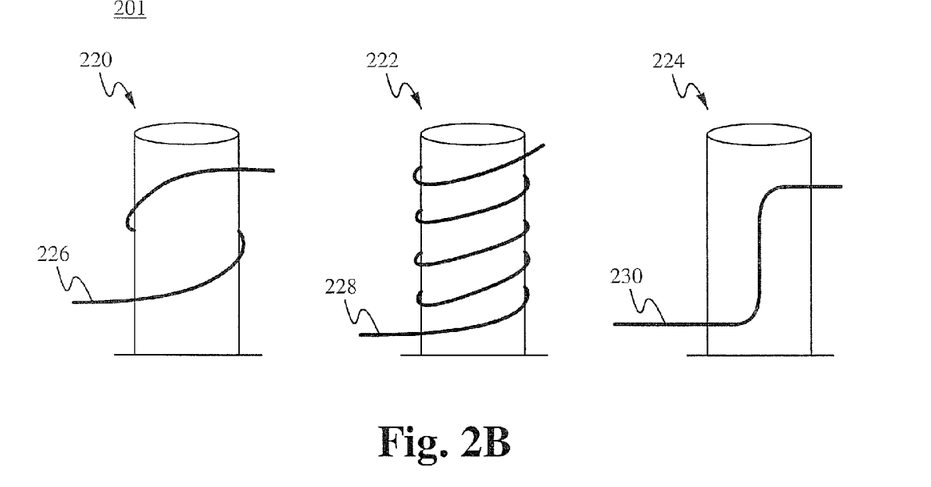
FIG. 2B illustrates methods of applying the sensing members for faulty battery detection on battery cells in accordance with some embodiments of the present invention.

FIG. 2B illustrates the methods 201 of applying the sensing members for faulty battery detection on the battery cells in accordance with some embodiments of the present invention. In some embodiments, the sensing member 226 is able to wrap the battery cell 220 in a complete circle. In alternative embodiments, the sensing member 228 is able to wrap the battery cell 222 in one or more zones or areas of the battery cell 222, so that a fault in any area of the battery cell 222 is able to be detected. In some alternative embodiments, the sensing member 230 is able to be attached to or coupled with one side of the battery cell 224, so that an easy installation of the sensing member 230 can be performed. A person who has ordinary skill in the art will appreciate that any other methods of applying the sensing member on the battery cells for faulty battery detection are included.

Figure 3A:
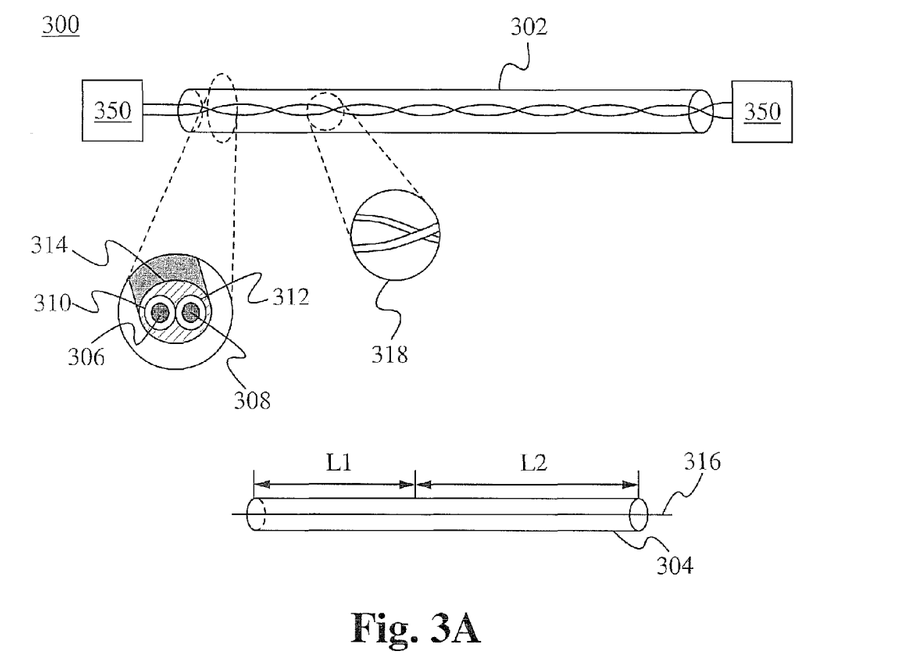
FIG. 3A illustrates a battery fault detecting system in accordance with some embodiments of the present invention.

FIG. 3A illustrates a battery fault detecting system 300 in accordance with some embodiments of the present invention. In some embodiments, the battery fault detecting system 300 comprises a sensing member 302 or 304 connecting to sensing parts 350. The sensing member 302 can contain two electrically conductive wires 306, 308. The two electrically conductive wires 306, 308 are able to be wrapped by coating polymer layers 310, 312 respectively, so that the electric conductive wire 306 is electrically isolated from the electrically conductive wire 308. The polymer coated conductive wires 306 and 308 forming a twisted wire pair 318 within a tube structure 314. In alternative embodiments, the sensing member 304 is substituted for the sensing member 302, which contains a conductive wire 316 having a positive temperature coefficient (PTC). In some embodiments, a negative temperature coefficient (NTC) wire comprises a structure that is same or substantially same as the structure 302, wherein the polymer 310 and 312 form the NTC.

Figure 3B:
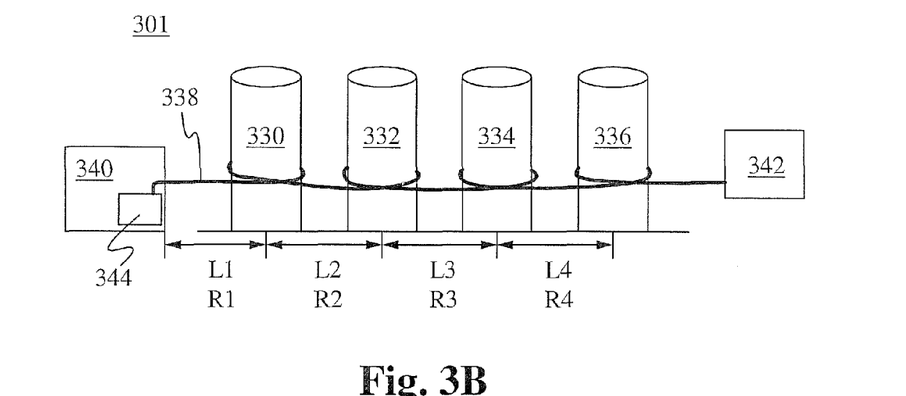
FIG. 3B illustrates a faulty battery locating system in accordance with some embodiments of the present invention.

FIG. 3B illustrates a battery fault locating system 301 in accordance with some embodiments of the present invention. FIG. 3B can be read in conjunction with FIG. 3A. In some embodiments, the battery fault locating system 301 comprises a sensing member 338, which can be either one of the sensing members 302 and 304 of FIG. 3A. In some embodiments, the sensing member 338 connects to a control unit 340 and couple with batteries 330, 332, 334, and 336. The control unit 340 is able to sense a location of a faulty battery cell in various ways. In some embodiments, the control unit 340 sends a constant voltage to the sensing member 338. For example, the control unit 340 is able to apply 50 mV to the electrically conductive wire 306 and 20 mV to the electrically conductive wire 308. When there are no faulty battery cells, the receiving unit 342 is able to receive a decreased and substantially constant current transmitted by the control unit 340. In contrast, if a battery cell goes in a faulty condition, the faulty battery can generate/liberate a significant amount of heat resulting in a hot spot. The hot spot can have a temperature above a predetermined threshold, such as 70° C., 100° C., 200° C., or 500° C. The polymers 310, 312, and/or the tube 314 of the sensing member 338 can have materials selected to melt at a pre-determined temperature, such as 155° F., so that the heat generated by a faulty battery cell can melt at least a potion of the polymers 310, 312, and/or the tube 314, thereby causing the conductive wire 306 to short/electrically communicate with the conductive wires 308 at the location of the faulty battery cell. The control unit 340 is able to include a receiver 344 for receiving the return current through the point of electrical communications between the conductive wire 306 and the conductive wire 308 at the location of a faulty battery. The location of a faulty battery is able to be determined by measuring the changes in the electrical resistance. For example, if the battery cell 330 is at a faulty state, the point of communication of two conducting wires 306 and 308 will be at a distance $L_1$ from the control unit 340. The electric loop with a length of $2 L_1$ has a resistance $2 R_1$. In the case when the battery cell 332 is at fault, the point of communication of two conducting wires 306 and 308 will be at a distance of $(L_1+L_2)$ from the control unit 340. The electric loop with a length of $2(L_1+L_2)$ has a resistance $2(R_1+R_2)$. Accordingly, the location of a faulty battery is able to be determined by measuring the changes of the electrical resistance of the electric loop mentioned above.

In alternative embodiments, the control unit 340 sends a constant current to the sensing member 338. A method of detecting a location of a faulty battery is able to use the method described above. For example, the control unit 340 can apply a constant current to the sensing member 338. The location of a faulty battery cell is able to be determined by measuring the changes to the voltage applied. For example, a fault at battery 336 can cause a higher resistance for the longer route of an electrical loop, $2(L_1+L_2+L_3+L_4)$, than the resistance caused by a faulty condition of battery 332. A faulty condition of the battery 332 can cause a shorter route of an electrical loop having a length of $2(L_1+L_2)$. Accordingly, the voltage applied is decreased more for a faulty condition on the battery 336 than for a faulty condition on the battery 332. Those skilled in the art will recognize that other electrical properties are able to be used for determining the location of the faulty battery, such as a percentage that an applied voltage has decreased.

Similarly, the sensing member 338 is able to measure the changes of various energy applied, including but not limited to light waves, sound waves, and/or magnetic waves. For example, the control unit 340 is able to send a light beam through the sensing member 338, which can contain an optical fiber, so that a change of a light beam pathway, intensity, or frequency signifies a faulty battery is detected. When the control unit 340 senses a faulty condition of at least one of the battery cells, the control unit 340 is able to shut off the electricity provided by the batteries or isolate the electric circuit of the battery cells/modules/packs to prevent a danger posed by the faulty battery.

Figure 4:
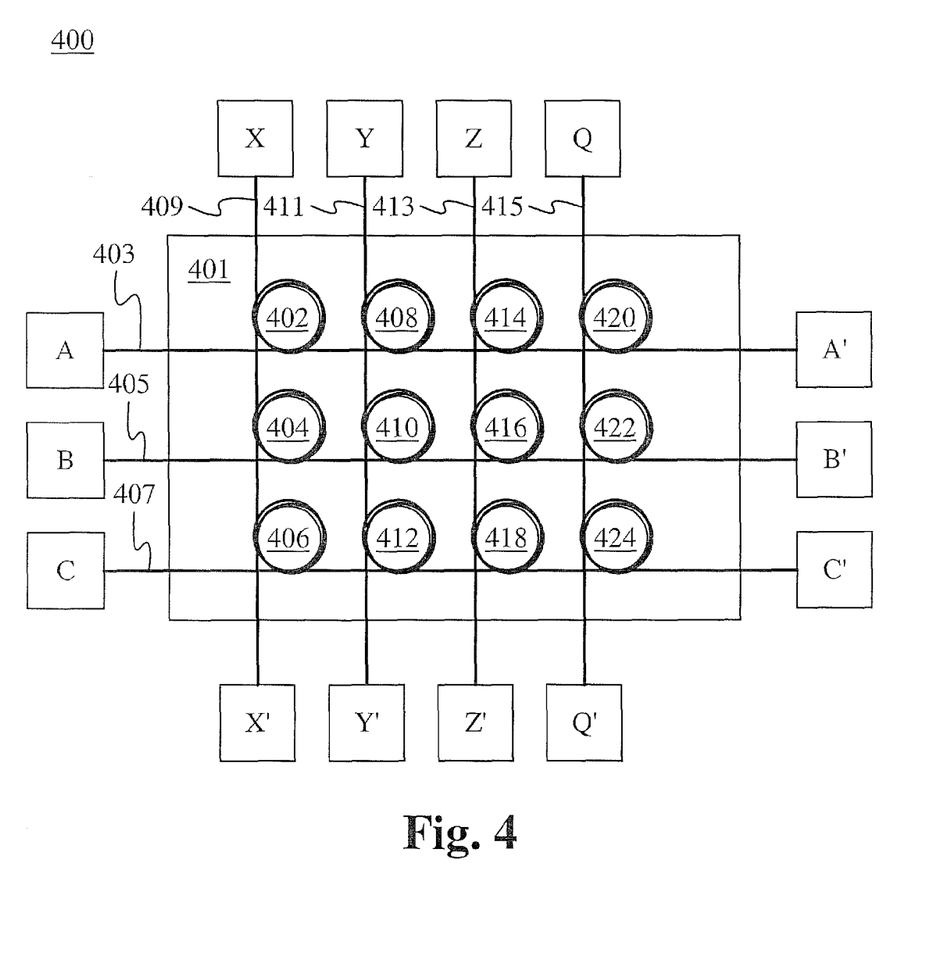
FIG. 4 illustrates another battery fault locating system in accordance with some embodiments of the present invention.

FIG. 4 illustrates another battery fault locating system 400 in accordance with some embodiments of the present invention. The battery fault locating system 400 is able to be arranged in various ways. The battery fault locating system 400 incorporates a battery fault locating network. In some embodiments, the battery fault locating system 400 comprise control units A, B, C, X, Y, Z, Q, receiving units A', B', C', X', Y', Z', Q', and sensing members 403, 405, 407, 409, 411, 413, 415. The battery module 401 contains battery cells 402, 404, 406, 408, 410, 412, 414, 416, 418, 420, 422, and 424. The sensing members 403, 405, 407, 409, 411, 413, and 415 are able to be similar to the sensing member 106 (FIG. 1). The sensing member 403 couples the control unit A and receiving unit A'. The sensing member 405 couples the control unit B and receiving unit B'. The sensing member 407 couples the control unit C and receiving unit C'. The sensing member 409 couples the control unit X and receiving unit X'. The sensing member 411 couples the control unit Y and receiving unit Y'. The sensing member 413 couples the control unit Z and receiving unit Z'. The sensing member 415 couples the control unit Q and receiving unit Q'.

In normal operation, each control unit, such as A, sends an electrical voltage, current, or signal to its corresponding receiving unit, such as A'. In the case when one of the battery cells is out of its normal operation condition, the signal sent from a control unit to its corresponding receiving unit is interrupted or changed. For example, when the battery cell 408 is in a faulty condition causing the battery cell 408 to have a temperature sufficient to melt a portion of the coated polymer of the sensing member 403 and/or 411, the melting results in the conductive wires contained within the sensing members to be in electrical communication. When the conductive wires are in electrical communication, the control units A, B, C, X, Y, Z, Q are able to send a signal to isolate the electric circuits or open electrical connections to the faulty battery cell and/or the normal battery cells. A person who has ordinary skill in the art would appreciate that any other arrangements/setups of the sensing members 403, 405, 407, 409, 411, 413, and 415 to detect a faulty status of the battery cells are applicable.

Figure 5:
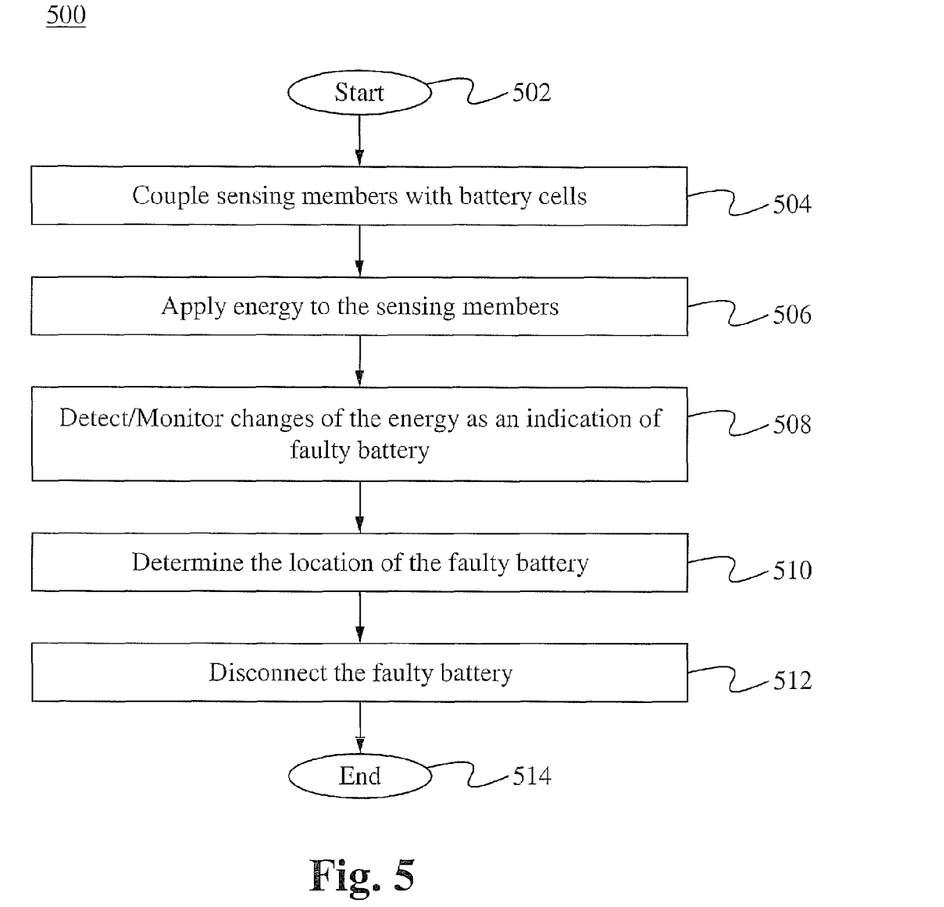
FIG. 5 is a flow chart illustrating a battery fault locating method in accordance with some embodiments of the present invention.

FIG. 5 is a flow chart illustrating a battery fault locating method 500 in accordance with some embodiments of the present invention. The method starts from Step 502. At Step 504, sensing members are coupled with the battery cells. The sensing members are able to be the sensing member 106 (FIG. 1). The coupling is able to be achieved by using the method described above, such as shown FIGS. 1, 2A, 2B, 3A, 3B, 4 and their accompanying text. At Step 506, energy is applied to the sensing members. The energy is able to be electric current, electric voltage, sound waves, light waves, magnetic forces, signals, or any other applicable energy, so long as a variation of the energy is detectable. At Step 508, changes in the energy are detected/monitored as indications of a faulty status of the battery cells. At Step 510, the location of the faulty battery is determined. The determination of the faulty battery location is able to be performed by using the setups and methods described in FIGS. 3A, 3B, 4, and their accompanying text. In Step 512, the faulty battery is disconnected from the system. The battery fault locating method 500 is able to stop at a Step 514.

In accordance with embodiments of the invention, one or more sensing members are coupled with battery cells. A selected energy or signal is applied to the sensing members and the changes to the energy/signal are monitored. When there is a faulty condition to the battery cells, the faulty battery generates heat capable of changing the signal received by the monitoring unit, thereby indicating a faulty condition of a battery cell. The battery fault locating system determines the location of the faulty battery and selectively stops the electricity by disconnecting the batteries. The battery fault locating system is able to be applied on all devices containing batteries, such as battery powered electric vehicles, battery packs, battery modules, and one or more battery cells.

The faulty battery locating systems and methods advantageously provide reliable and quick detection of a faulty battery using the sensing member described above. The sensing member is inexpensive and can be easily installed during the factory manufacturing process.

Various modifications to the described embodiments will be readily apparent to those persons skilled in the art, and the generic principles herein may be applied to other embodiments. Thus, the present invention is not intended to be limited to the embodiments shown but is to be accorded the widest scope consistent with the principles and features described herein. It will be readily apparent to one skilled in the art that other modifications may be made to the embodiments without departing from the spirit and scope of the invention as defined by the appended claims.

What is claimed is:

1. A device comprising:
    at least one heat sensitive member that is thermally coupled to one or more batteries, wherein the heat sensitive member changes conductivity when the one or more batteries reach a threshold temperature, the heat sensitive member including:
        a first conductor surrounded by a first polymer;
        a second conductor surrounded by a second polymer; and
        a housing containing the first conductor and the second conductor, wherein the first polymer and the second polymer melt at the threshold temperature causing the first conductor and the second conductor to come into contact while the housing electrically isolates the first conductor and the second conductor from the one or more batteries;
    a controller electrically connected to the heat sensitive member, wherein the controller disconnects the one or more batteries from a system when conductivity of the heat sensitive member changes as the one or more batteries reach the threshold temperature.

2. The device of claim 1, further comprising a plurality of batteries that include the one or more batteries, wherein the heat sensitive member is routed to be thermally coupled to the plurality of batteries.

3. The device of claim 1, wherein the controller comprises a temperature sensor electrically coupled to the heat sensitive member.

4. The device of claim 1, further comprising a plurality of battery packs, each battery pack including a plurality of batteries that include the one or more batteries, wherein the heat sensitive member is thermally coupled to and routed to come in contact with each battery pack and wherein the plurality of battery packs are electrically connected in series.

5. The device of claim 1, wherein a plurality of batteries, including the one or more batteries, are electrically connected in parallel to form a first block and wherein the block is thermally coupled to the heat sensitive member.

6. The device of claim 5, further comprising a plurality of blocks including the first block, wherein the plurality of blocks are electrically connected in series to form a first module.

* * * * *